United States Patent [19]

Wu

[11] Patent Number: 4,901,808
[45] Date of Patent: Feb. 20, 1990

[54] DEVICE FOR AUTOMATICALLY WEIGHING OBJECTS IN CONVEYANCE

[76] Inventor: Sheng J. Wu, P.O. Box 1-79, Taipei, Taiwan, 10602

[21] Appl. No.: 227,887

[22] Filed: Aug. 3, 1988

[51] Int. Cl.$^4$ .................. G01G 19/00; G01G 23/22
[52] U.S. Cl. ............................ 177/145; 177/25.15
[58] Field of Search ............... 177/145, 210 FP, 25.15

[56] References Cited

U.S. PATENT DOCUMENTS 3,955,665  5/1976  Pettis, Jr. et al. ............... 177/145 X
4,778,018 10/1988  Cordery et al. ............... 177/210 FP Primary Examiner—George H. Miller, Jr.
Attorney, Agent, or Firm—Lolos & Keegan

[57] ABSTRACT

A device for weighing slender or piece-like objects being conveyed. This device includes a driving means, a fixed stand, a movable stand, a conveyed onto a supporting portion of the movable stand, the movable stand will be lowered thereby putting the object on the weighing scale and enabling the object to be separated from other mechanisms. After the object has been weighed, the movable stand will be restored to its original position and the object will continue to be conveyed. The weighing result can be input to a computer for analysis or control, or the device can be an integral part of a completely automatic operating system.

9 Claims, 5 Drawing Sheets

DEVICE FOR AUTOMATICALLY WEIGHING OBJECTS IN CONVEYANCE

BACKGROUND OF THE INVENTION

The present invention relates to a device for automatically weighing objects being conveyed, and more specifically to a device which permits automatic weighing of slender or piece-like objects being conveyed on a conveyer.

Traditionally, in order to weigh piece - like objects such as letters, it is necessary to manually place the object on a scale, such as electronic scale, and then remove it from the scale and affix a label or stamps according to the range in which the weight of the object falls. However, these procedures require increased manual labor which increases the overall cost of the operation. Moreover, these manual procedures are prone to errors, especially when the classification system for the ranges of weight is sophisticated.

Although prior art systems exist that convey an object to be weighed onto an electronic scale, the technical problem exists in isolating the object from contact with other objects to obtain an accurate measurement of weight.

Therefore, a problem yet to be solved in the prior art is how to separate a moving object to be weighed from the conveyer and, after weighing it, restoring the object onto the conveyer to keep the operation moving in a completely automatic manner.

In a prior art system a weighing plate of an electronic scale is urged up when the moving object to be weighed reaches a position above the electronic scale thereby separating the object from the conveyer. The weighing plate is restored to its original position after the weighing process. However, the electronic scale is a high precision device and this up-and-down movement adversely affects its precision and may be harmful to its construction. Thus an accurate and stable weighing result is difficult to obtain.

The present invention is a novel weighing device that overcomes the disadvantages of the prior art weighing devices for weighing a moving piece - like object.

SUMMARY OF THE INVENTION

A device for automatically weighing objects being conveyed according to the present invention comprises means for conveying an object to positions where said object is to be weighed and processed; means for driving said conveying means; means for sensing the position of said object being conveyed; means for moving said object from a first horizontal position to a second horizontal position where said object is to be weighed; means for sensing said object in the position to be weighed; means for weighing said object when said object reaches the position to be weighed; means for restoring said object to said first horizontal position after said object has been weighed so as to allow continued conveyance of said object.

Briefly, the preferred embodiment of the present invention provides an automatic weighing device which can be utilized to weigh slender or piece - like objects, wherein a conveyer is divided into a fixed portion and a movble portion. The fixed portion is the same as the construction of a conventional conveyer. The movable portion is disposed above the weighing plate of a weighing scale. As an object to be weighed reaches the movable portion, the movable portion will be lowered automatically to put the object on the weighing plate of the weighing scale and to separate the object to be weighed from contact with any other portion of the appartus.

During weighing, the object is separated from the other mechanisms of the device. Therefore, an accurate measurement can be achieved. After weighing, the movable portion is restored to its initial position and the object can continue to be conveyed to another process. Thus, the present invention can constitute an important part of a completely automatic operation system.

Further objectives and advantages of the present invention will become apparent to those having skill in the art in view of the following description and drawings.

DETAILED DESCRIPTION OF THE PREFERRED EMBODIMENT

Figure 1:
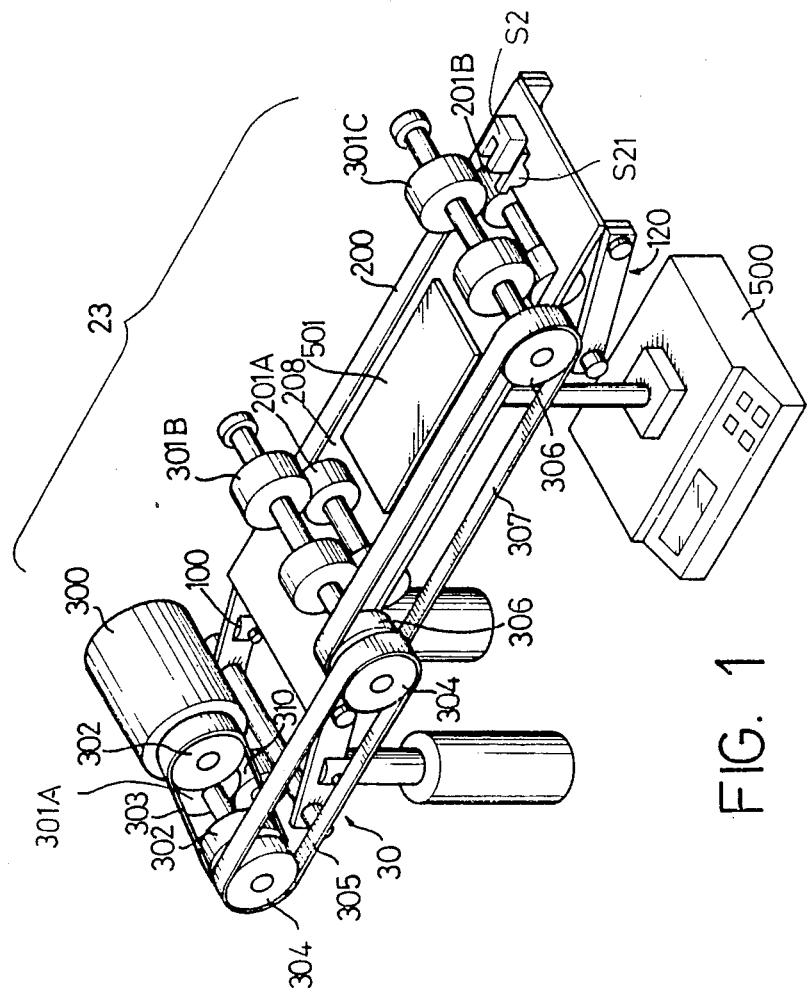
FIG. 1 is a perspective view of one embodiment of a device for automatically weighing objects being conveyed in accordance with the present invention.

Referring to the drawings, one embodiment of a conveying device 23 for automatically weighing objects in conveyance according to the present invention is illustrated. As shown in FIG. 1, the device 23 of the present invention comprises a driving means 300, for example a motor, a first conveying means 301A and a first idle wheel 310 thereof, a second conveying means 301B and a respective second idle wheel 201A, a third conveying means 301C and a respective third idle wheel 201B, a fixed stand 400 (FIG. 2), a movable stand 200 with a pair of rocking arms 120 and a weighing scale 500 located under the movable stand 200, and sensing means S1, S2.

A novel aspect of the present invention is the movable stand 200 that includes a supporting stand with a square opening 208 in the middle portion thereof. At both ends of the opening 208 there are disposed the second and third idle wheels 201A and 201B that are in cooperative relationship with the second and third conveying means 301B and 301C respectively to convey an object 10 to be weighed.

Figure 2:
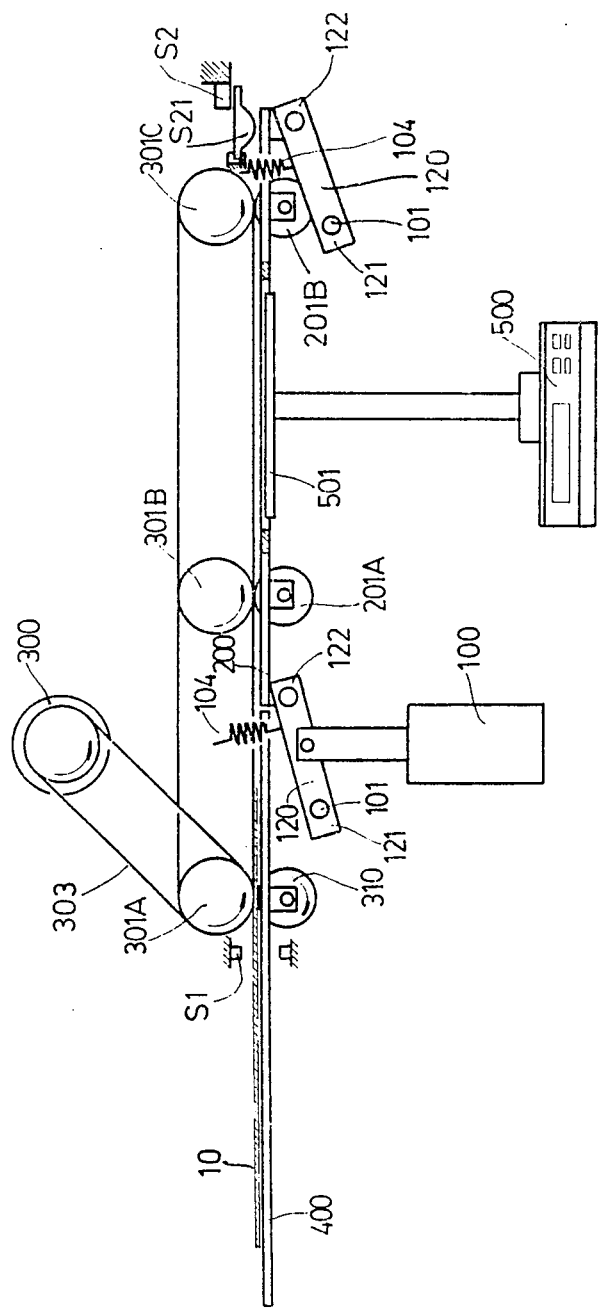
FIG. 2 is a side view of the device of FIG. 1 in accordance with the present invention, showing an object to be weighed at an initial position.

Referring to FIG. 2, a movable end 122 of each of a pair of rocking arms 120 is pivotally connected at each end of the movable stand 200. The other end of each rocking arm 120 is pivotally connected at a pivot 101. A pair of electromagnetic actuators 100, such as a solenoid, is connected to the middle portion of the rocking arm 120 nearer the starting position of this device. When the electromagnetic actuator 100 is activated, the movable end 122 is pulled down with the pivot 101 as a fulcrum. Since the moving stand 200 is attached to the movable ends 122 of both of the rocking arms 120, both movable ends 122 are actuated and descend simultaneously to move stand 200 to a lower horizontal plane.

Figure 4:
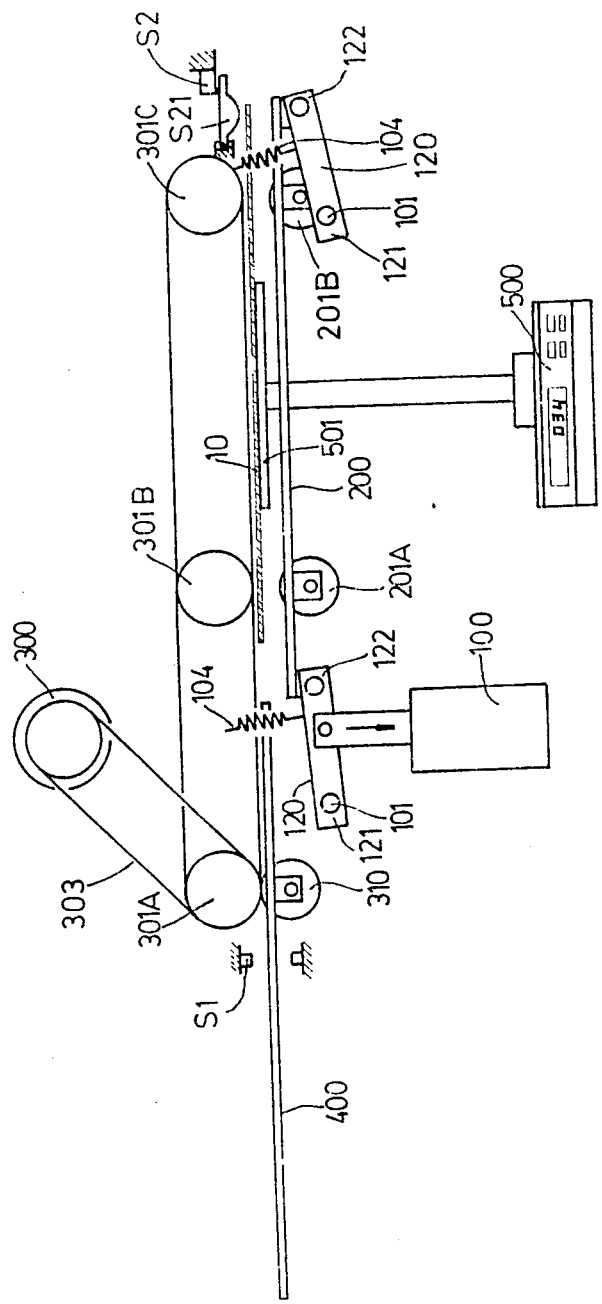
FIG. 4 is a side view of the device of FIG. 1, showing the object being weighed by a weighing scale.

As best shown in FIG. 4, the second and third idle wheels 201A and 201B are connected to move with the movable stand 200 in vertical planes corresponding with the second and third conveying means 301B and 301C, respectively. The first conveying means 301A precedes the second conveying means 301B in the conveying device 23. The driving means 300, e.g. a stepping motor, drives the first, second and third conveying means. The first conveying means 301A is urged by a first belt wheel 302 (FIG. 1) and a first conveying belt 303 thereof. Referring again to FIG. 1, the second and third conveying means 301B, 301C are urged by second belt wheels 304, a second conveying belt 305, third belt wheels 306, and a third conveying belt 307.

Disposed beneath the opening 208 of the movable stand 200 is a weighing scale 500. A weighing plate 501 of the weighing scale 500 is positioned above the main body of the weighing scale with its surface a little lower than the movable stand 200 so that the weighing plate 501 does not obstruct the conveyance of the article to be weighed.

Figure 3:
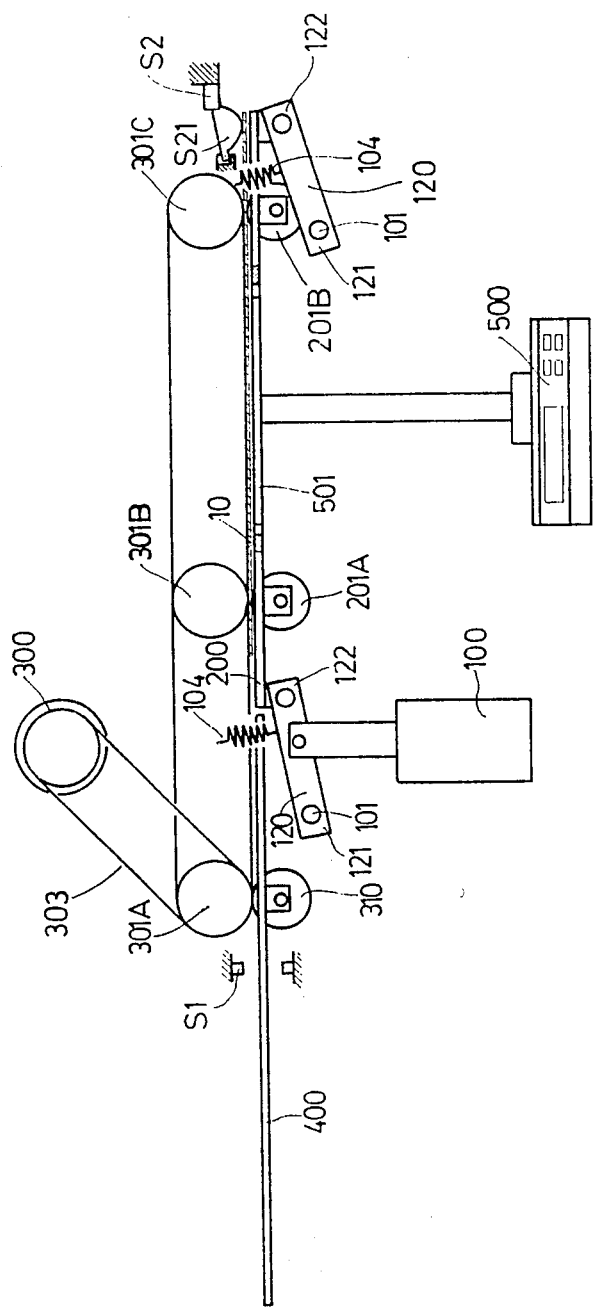
FIG. 3 is a side view of the device of FIG. 1, showing the object to be weighed being conveyed to a weighing position.

The operation of the apparatus of the present invention can best be understood by referring to FIGS. 2 through 5. Prior to reaching the first conveying means 301A and first idle wheel means 310, object 10 comes in contact with a first sensor S1, such as photo-sensor, and the driving means 300 is actuated to convey object 10 to a position to be weighed, as shown in FIGS. 2 (initial position) and 3 (weighing position). At the positions shown in FIGS. 2 and 3, the electromagnetic actuator 100 is not activated. Therefore, the movable ends 122 of the rocking arms 120, due to the force of the springs 104, urge the second and third idle wheels 201A, 201B upward and in close contact with the second and third conveying means 301B, 301C, whereby the object 10 can be delivered onto the movable stand 200 as shown in Fig. 3.

In the non-weighing state, the second sensor S2 (e.g. a photo-sensor) is deactivated, with an activating piece S21' of the second sensor S2 disposed behind the third conveying means 301C isolating the second sensor S2 and inhibiting the generation of a sensor signal. When the object 10 reaches the activating piece S21, it raises the activating piece S21 upward and enables the second sensor S2 to send a sensor signal to actuator 100. The electromagnetic actuator 100 is thereby activated and the movable end 122 of the related rocking arm 120 is pulled down lowering movable stand 200 and the movable end of the other rocking arm. The object 10 to be weighed is then seated on the weighing plate 501 of the weighing scale 500, as illustrated in FIG. 4. The weighing scale can weigh the object 10, and display the result on the display means of the weighing device 500 or send out a signal to perform some other control functions. In this manner, an accurate weight of the object 10 can be readily obtained as the object to be weighed is isolated from the rest of the device.

Figure 5:
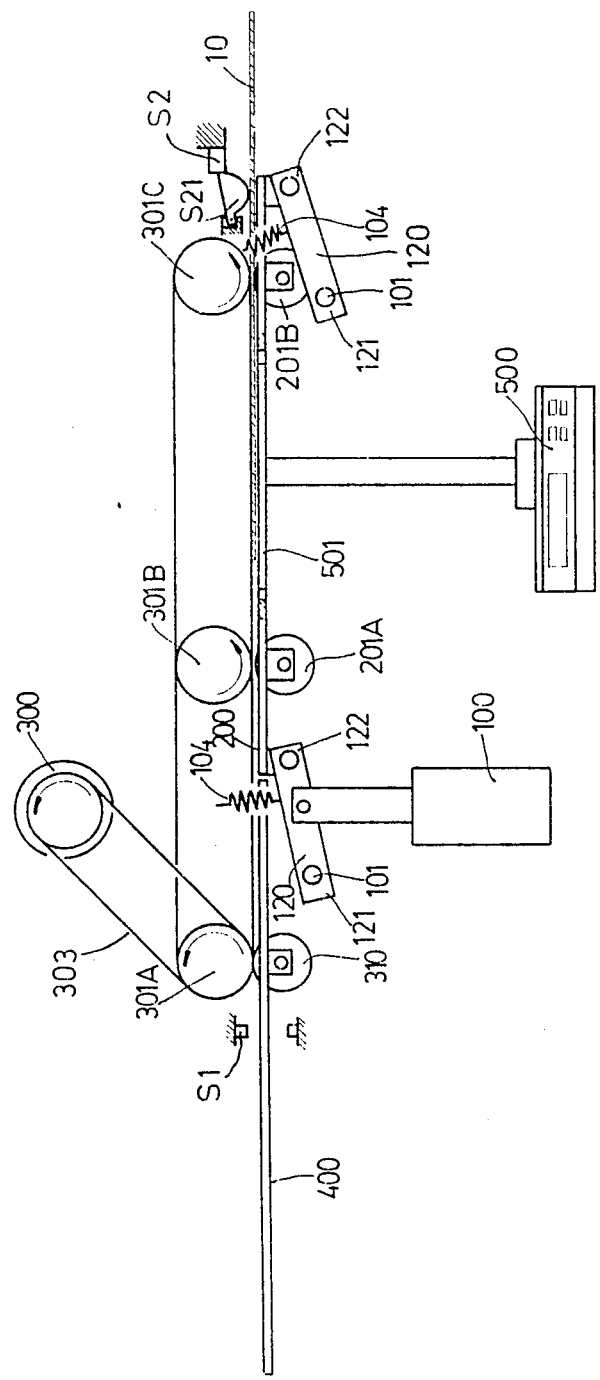
FIG. 5 shows the object being further conveyed after having been weighed.

After a pre-set time period following measurement of the object's weight, the electromagnetic actuator 100 will be deactivated, and both rocking arms 120 are drawn back by the force of the springs 104 and the movable stand 200 is restored to its initial position. The object 10, having been weighed, is again held between the second and third idle wheels 201A, 201B and the second and third conveying means 301B, 301C, and thus continues to be conveyed as shown in FIG. 5.

It should be emphasized that by using this invention the slender piece - like article is weighed automatically in a moving conveyor and the result can be transmitted to a computer for analysis or control. Thus, the automatic weighing device of the present invention can play an important role in a completely automatic operating system.

As various embodiments of the invention may be made without departing from the scope of the invention, it is to be understood that the specific embodiments described herein or shown in the accompanying drawings are to be interpreted as illustrative and not in a limiting sense. Thus, it will be appreciated that the scope of the invention is to be limited only by the appended claims.

I claim:

1. A device for weighing objects during the conveyance of said objects comprising:
   means for conveying an object to a weighing position;
   means for driving said conveying means;
   means for sensing said object's location at said weighing position;
   said conveying means including a movable and vertically displaceable stand for supporting said object and responsive to said sensing means sensing said object at said weighing position for moving said object from a first horizontal weighing position to a second lower horizontal weighing position;
   means for weighing said object in said second lower horizontal weighing position, and
   wherein said movable stand includes an opening, whereby said means for weighing is received through said opening thereby separating said object from said conveying means during weighing.

2. A device according to claim 1, wherein said weighing means includes a weighing plate and said movable stand opening is positioned in alignment with said plate such that when said object is moved to said second horizontal weighing position said plate is received through said opening to contact and support said object.

3. A device according to claim 1, further including a pair of rocking arms, a first one of said arms having an end pivotally connected to a first end of said movable stand, and a second one of said arms having an end pivotally connected to a second end of said movable stand.

4. A device according to claim 3 further including an actuating means operatively connected to said first one of said rocking arms.

5. The device according to claim 4 wherein said actuating means is responsive to said sensing means sensing said object at said weighing position for moving said first rocking arm to cause said movable stand to move from said first horizontal weighing position to said second horizontal weighing position.

6. The device according to any one of the preceding claims wherein said conveying means comprises at least one idle wheel.

7. The device according to any one of claims 2, 3, 4 or 5 wherein said driving means is a motor.

8. The device according to any one of claims 2, 3, 4 or 5 wherein said weighing means is an electronic scale.

9. The device according to any one of claims 2, 3, 4 or 5 wherein said sensing means is a photo-sensor.

* * * * *